(12) United States Patent
Adachi et al.

(10) Patent No.: US 7,831,842 B2
(45) Date of Patent: Nov. 9, 2010

(54) PROCESSOR FOR CONTROLLING PERFORMANCE IN ACCORDANCE WITH A CHIP TEMPERATURE, INFORMATION PROCESSING APPARATUS, AND METHOD OF CONTROLLING PROCESSOR

(75) Inventors: Kenichi Adachi, Tokyo (JP); Kazuaki Yazawa, Chiba (JP); Iwao Takiguchi, Kanagawa (JP); Atsuhiko Imai, Tokyo (JP); Tetsuji Tamura, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 867 days.

(21) Appl. No.: 10/575,041

(22) PCT Filed: Apr. 8, 2005

(86) PCT No.: PCT/JP2005/006965

§ 371 (c)(1),
(2), (4) Date: Feb. 22, 2007

(87) PCT Pub. No.: WO2005/124550

PCT Pub. Date: Dec. 29, 2005

(65) Prior Publication Data

US 2007/0143763 A1 Jun. 21, 2007

(30) Foreign Application Priority Data

Jun. 22, 2004 (JP) ............................. 2004-183988

(51) Int. Cl.
G06F 1/00 (2006.01)
G06F 9/44 (2006.01)
(52) U.S. Cl. ........................ 713/300; 713/320; 713/323; 703/21; 703/22
(58) Field of Classification Search ................. 713/300, 713/320, 323; 703/21, 22
See application file for complete search history.

(56) References Cited

U.S. PATENT DOCUMENTS 5,913,068 A * 6/1999 Matoba ...................... 713/322

(Continued)

FOREIGN PATENT DOCUMENTS

CN 571186 11/2004

(Continued)

OTHER PUBLICATIONS

Office Action to corresponding Taiwan Patent Application No. 094112930, dated Sep. 7, 2006, 4 pgs.

(Continued)

Primary Examiner—Vincent T Tran
(74) Attorney, Agent, or Firm—Matthew B. Dernier, Esq.; Gibson & Dernier LLP

(57) ABSTRACT

A heat generation amount estimation unit acquires the number of sub processors currently in operation, acquires the current operating frequency, and estimates the amount of heat generation after a period Δt. A temperature control unit estimates the temperature after the period Δt based on the current temperature input from a temperature sensor and the amount of heat generation estimated, and compares it with a predetermined threshold temperature. If the predetermined threshold temperature is reached, the temperature control unit acquires the number of sub processors available in parallel after the period Δt from a task management unit, and consults a performance table to determine which operation point to shift to. A sub processor control unit and a frequency control unit switch to the number of sub processors in operation and the operating frequency accordingly. The performance table lists possible operation points in order of performance.

30 Claims, 6 Drawing Sheets

| | NUMBER OF SUB PROCESSORS USED IN PARALLEL | | | | |
|---|---|---|---|---|---|
| | | 0 | 1 | 2 | 3 | 4 |
| OPERATION POINTS IN ORDER OF PERFORMANCE | | m | h | d | b | a |
| | | n | k | g | d | b |
| | | o | l | h | e | c |
| | | | m | j | g | d |
| | | | n | k | h | e |
| | | | o | l | i | f |
| | | | | m | j | g |
| | | | | n | k | h |
| | | | | o | l | i |
| | | | | | m | j |
| | | | | | n | k |
| | | | | | o | l |
| | | | | | | m |
| | | | | | | n |
| | | | | | | o |

U.S. PATENT DOCUMENTS

| | | | |
|---|---|---|---|
| 6,047,248 A * | 4/2000 | Georgiou et al. | 702/132 |
| 6,091,255 A | 7/2000 | Godfrey | |
| 6,345,240 B1 * | 2/2002 | Havens | 703/21 |
| 6,718,475 B2 * | 4/2004 | Cai | 713/323 |
| 6,938,176 B1 * | 8/2005 | Alben et al. | 713/323 |
| 6,988,211 B2 * | 1/2006 | Cline et al. | 713/300 |
| 7,062,304 B2 * | 6/2006 | Chauvel et al. | 455/574 |
| 7,111,178 B2 * | 9/2006 | Rusu et al. | 713/300 |
| 7,254,812 B1 * | 8/2007 | Menezes | 718/102 |
| 2002/0065049 A1 | 5/2002 | Chauvel et al. | |
| 2002/0147932 A1 * | 10/2002 | Brock et al. | 713/300 |
| 2003/0110012 A1 * | 6/2003 | Orenstien et al. | 702/188 |
| 2003/0229662 A1 * | 12/2003 | Luick | 709/106 |
| 2004/0037346 A1 * | 2/2004 | Rusu et al. | 374/121 |
| 2004/0128663 A1 | 7/2004 | Rotem | |
| 2005/0046400 A1 * | 3/2005 | Rotem | 323/234 |
| 2005/0071843 A1 * | 3/2005 | Guo et al. | 718/101 |
| 2005/0081181 A1 * | 4/2005 | Brokenshire et al. | 717/100 |
| 2005/0216775 A1 * | 9/2005 | Inoue | 713/300 |
| 2005/0278520 A1 * | 12/2005 | Hirai et al. | 713/1 |
| 2006/0253715 A1 * | 11/2006 | Ghiasi et al. | 713/300 |

FOREIGN PATENT DOCUMENTS

| | | |
|---|---|---|
| JP | 10-240704 | 9/1998 |
| JP | 11-237933 | 8/1999 |
| JP | 2000-322259 | 11/2000 |
| JP | 2001-195134 | 7/2001 |
| JP | 2004-078929 | 3/2004 |
| JP | 2004-126968 | 4/2004 |
| WO | WO 03/083693 A1 * | 9/2003 |

OTHER PUBLICATIONS

Office Action for Korean Patent Application No. 10-2006-7014031 dated Nov. 23, 2007.

International Search Report for PCT/JP2005/006965, dated Jul. 26, 2005.

International Preliminary Report on Patentability based on corresponding PCT/JP2005/006965, dated Dec. 28, 2006, 4 pgs.

Office Action for Chinese Patent Application No. 2005800011005 dated Jul. 20, 2007.

Office Action for JP Application No. 2004-183988, Jan. 4, 2006.

Supplemental European Search Report for corresponding EP application EP-05728541.3, dated Aug. 6, 2010.

* cited by examiner

FIG.6
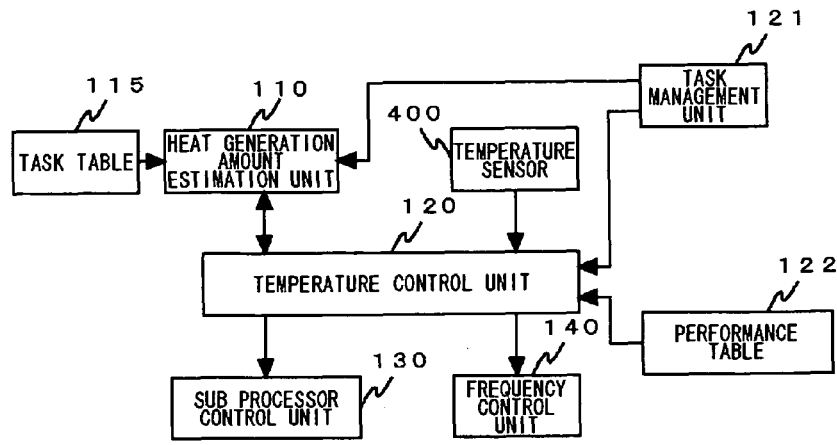
FIG.7
| TASK TYPE | NUMBER OF SUB PROCESSORS AVAILABLE IN PARALLEL | AMOUNT OF HEAT GENERATION |
|---|---|---|
| TASK 1 | n1 | E1 |
| TASK 2 | n2 | E2 |
| TASK 3 | n3 | E3 |
| ⋮ | ⋮ | ⋮ |
115
FIG.8
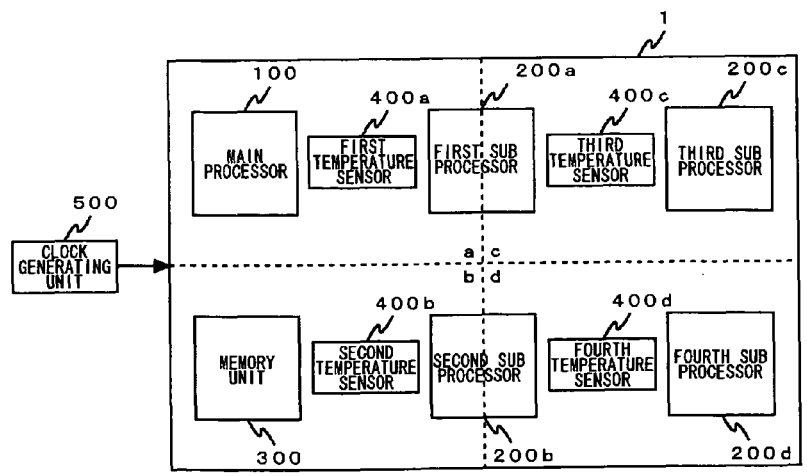

FIG.10
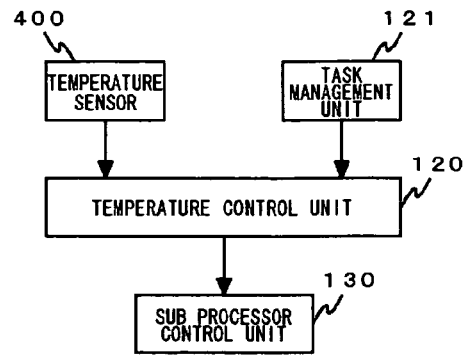
FIG.11
| | TEMPERATURE OF SUB PROCESSOR |
|---|---|
| 1 | FOURTH SUB PROCESSOR |
| 2 | SECOND SUB PROCESSOR |
| 3 | THIRD SUB PROCESSOR |
| 4 | FIRST SUB PROCESSOR |
FIG.12
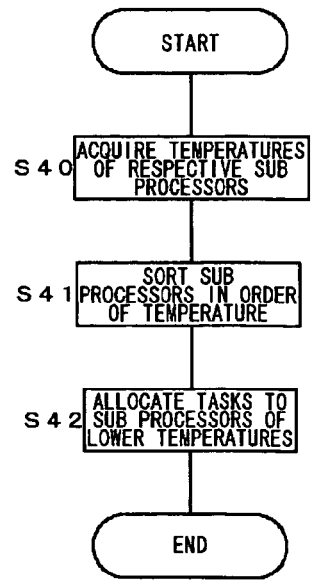

PROCESSOR FOR CONTROLLING PERFORMANCE IN ACCORDANCE WITH A CHIP TEMPERATURE, INFORMATION PROCESSING APPARATUS, AND METHOD OF CONTROLLING PROCESSOR

BACKGROUND OF THE INVENTION

1. Field of the Invention

The invention relates to processor technologies. In particular, the invention relates to a processor for controlling performance in accordance with a chip temperature, and a method of controlling a processor.

2. Description of the Related Art

With increasing trends toward finer manufacturing processes and higher device integration, it has become extremely important for LSI design to take the amount of heat generation into account as chips' performance limits. At higher temperatures, chips can malfunction or drop in long-term reliability. Various measures against heat generation have thus been taken. For example, in one of the measures, radiating fins are formed on the top of a chip so as to release heat occurring from the chip.

Besides, it has been studied to schedule tasks of a processor based on the distribution of power consumption of the chip (for example, see US Patent Application Publication No. 2002/0065049).

In cases of a sharp rise in temperature or the like, the foregoing measures may sometimes fail to address sufficiently. One of the possible techniques for dealing with those cases is to decrease the performance itself by such processing as lowering the operating frequency of the chip. Decreasing the performance is wasteful, however, if more than necessary.

SUMMARY OF THE INVENTION

The present invention has been achieved in view of the foregoing problem and relates to a processor, an information processing apparatus, and a method of controlling a processor which are capable of maintaining temperature within a range where proper operation is guaranteed, while suppressing a drop in performance.

One embodiment of the present invention relates to a method of controlling a processor. This method comprises switching parallel availability of a plurality of processing blocks formed inside a processor in accordance with a temperature. A combination of the parallel availability and an operating frequency may be switched in accordance with a temperature of the processor. Tasks may be allocated in consideration of the number of the plurality of processing blocks available in parallel, the number being determined task by task. Tasks may be allocated to at least a processing block having a lowest temperature among the plurality of processing blocks.

When the processor is equipped with a plurality of sub processors, the "processing blocks" may be the respective sub processors. The "parallel availability" may be the number of sub processors in operation.

Another embodiment of the present invention also relates to a method of controlling a processor. This method comprises switching between combinations of parallel availability of a plurality of processing blocks formed inside a processor and an operating frequency by consulting a predetermined table.

The table may describe processing performance for each of the combinations. When the processor is predicted to exceed or exceeds a predetermined threshold in temperature, a combination yielding a smaller amount of heat generation than that of a combination selected currently may be detected out of the combinations, so that the combination selected currently is switched to the combination detected. Moreover, when a plurality of combinations are detected, the combination selected currently may be switched to a combination yielding maximum performance.

Yet another embodiment of the present invention relates to a processor. This processor comprises: a plurality of processing blocks; a sensor which measures a temperature; and a control unit which switches parallel availability of the plurality of processing blocks in accordance with the measured temperature. The control unit may switch between combinations of the parallel availability and an operating frequency in accordance with the temperature. The control unit may allocate tasks in consideration of the number of a plurality of processing blocks available in parallel, the number being determined task by task. The control unit may allocate tasks to at least a processing block having a lowest temperature among the plurality of processing blocks.

Yet another embodiment of the present invention relates to a processor. This processor comprises: a plurality of processing blocks; a sensor which measures a temperature of the processor; and a control unit which switches between combinations of parallel availability of the plurality of processing blocks and an operating frequency in accordance with the measured temperature.

The table may describe processing performance for each of the combinations. If the processor is predicted to exceed or exceeds a predetermined threshold in temperature, the control unit may select a combination yielding a smaller amount of heat generation than at present out of the combinations, and switch to the combination selected.

Yet another embodiment of the present invention relates to an information processing apparatus. This apparatus has a processor which executes various tasks, the processor comprising: a plurality of processing blocks; a sensor which measures a temperature; and a control unit which switches parallel availability of the plurality of processing blocks in accordance with the measured temperature.

Incidentally, any combinations of the foregoing components, and any conversions of expressions of the present invention from/into methods, apparatuses, systems, computer programs, and the like are also intended to constitute applicable aspects of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 6 is a functional block diagram for explaining a second embodiment;

FIG. 7 is a chart showing a task table;

FIG. 8 is a diagram showing the configuration of a processor according to a third embodiment;

FIG. 10 is a functional block diagram for explaining a fourth embodiment;

FIG. 11 is a chart showing a table sorted in ascending order of temperature according to the fourth embodiment; and FIG. 12 is a flowchart for explaining the functional blocks of FIG. 10.

DETAILED DESCRIPTION OF THE INVENTION

The invention will now be described by reference to the preferred embodiments. This does not intend to limit the scope of the present invention, but to exemplify the invention.

First Embodiment

Figure 1:
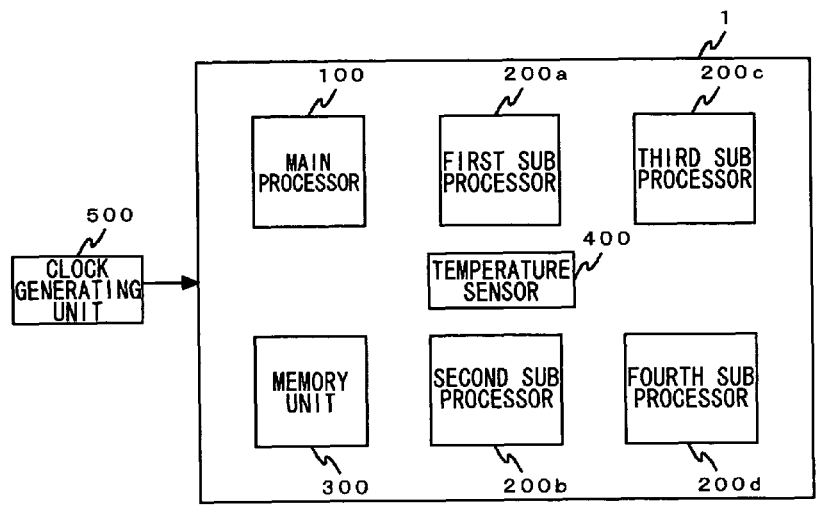
FIG. 1 is a diagram showing the configuration of a processor according to a first embodiment.

FIG. 1 is a diagram showing the configuration of a processor according to a first embodiment. The processor 1 includes, in its chip, a main processor 100, four first to fourth sub processors 200a to 200d, a memory unit 300, and a temperature sensor 400. These components are connected with not-shown buses. The sub processors 200 are not limited to four in number, but may be provided in any arbitrary number. For example, eight sub processors may be provided. These components are not limited to the layout pattern shown in FIG. 1, either, but may be arranged arbitrarily. A clock generating unit 500 supplies a basic frequency to the processor 1.

The main processor 100 controls the entire processor 1. In particular, it manages the first to fourth sub processors 200a to 200d, and allocates tasks among these as appropriate. The main processor 100 also exercises temperature management, power management, and performance management. The first to fourth sub processors 200a to 200d execute tasks allocated by the main processor 100. The temperature sensor 400 outputs a temperature measurement to the main processor 100. The temperature sensor 400 may be formed outside the package, whereas it is preferably formed on the die in the package for the sake of measuring sharp changes in temperature.

Figure 2:
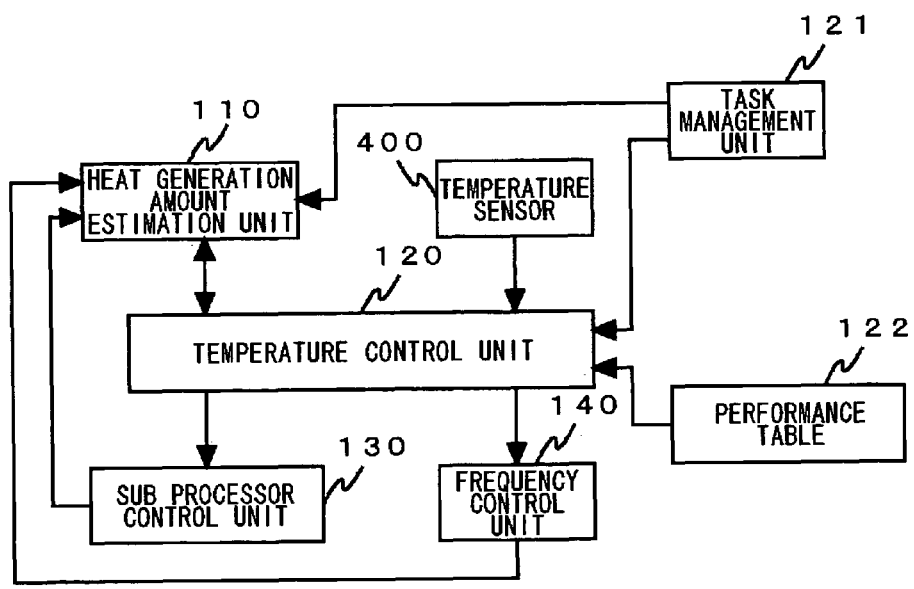
FIG. 2 is a functional block diagram for explaining the first embodiment.

FIG. 2 is a diagram showing functional blocks according to the first embodiment, which are realized chiefly by the cooperation of the main processor 100, the memory unit 300, and software programs loaded into the memory unit 300. It will thus be understood by those skilled in the art that these functional blocks may be achieved in various forms of combinations of hardware and software. In FIG. 2, the temperature sensor 400 outputs the current chip temperature to a temperature control unit 120. The temperature control unit 120 estimates the temperature after a period αt based on the current temperature input from the temperature sensor 400 and an estimated amount of heat generation input from a heat generation amount estimation unit 110. This relationship is expressed by the following equation (1):

$$T_{t+\Delta t}=f(Tt,E), \quad (1)$$

where $T_{t+\Delta t}$ is the temperature after the period Δt, $T_t$ is the current temperature, and E is the estimated amount of heat to be generated in this period Δt. As above, the temperature $T_{t+\Delta t}$ after the period Δt is determined as a function of the current temperature $T_t$ and the estimated amount of heat generation E.

The heat generation amount estimation unit 110 acquires the number of sub processors 200 currently in operation from a sub processor control unit 130, and acquires the current operating frequency from a frequency control unit 140. Based on these values, the heat generation amount estimation unit 110 then determines the estimated amount of heat generation E. The relationship is expressed by the following equation (2):

$$E=\int[\alpha \cdot C \cdot V_{dd}^2 \cdot f]dt \quad (2)$$

where α is a predetermined proportionality constant, C is a variable for expressing the load in equivalent capacitance, $V_{dd}$ is the power supply voltage, and f is the operating frequency. The power supply voltage $V_{dd}$ is squared in use. These terms are multiplied with one another and integrated with respect to the foregoing period Δt, thereby determining the estimated amount of heat generation E.

In the present embodiment, the load capacitance C is given by the following equation (3):

$$C=C_m+NC_s \quad (3)$$

where $C_m$ is the capacitance of the main processor, $C_s$ is the capacitance of a single sub processor 200, and N is the number of sub processors 200 in operation.

The heat generation amount estimation unit 110 passes the estimated amount of heat generation E determined by the foregoing calculation to the temperature control unit 120. As shown in the foregoing equation (1), the temperature control unit 120 estimates the temperature $T_{t+\Delta t}$ after the foregoing period Δt based on the current temperature $T_t$ acquired from the temperature sensor 400 and the estimated amount of heat generation E. Then, as shown in the following formula (4), it is determined if this estimated temperature $T_{t+\Delta t}$ reaches or exceeds a predetermined threshold temperature $T_{th}$. The predetermined threshold temperature $T_{th}$ is a temperature beyond which proper operation of the entire processor 1 will not be guaranteed:

$$T_{t+\Delta t} \geq T_{th} \quad (4).$$

Figures 3, 4:
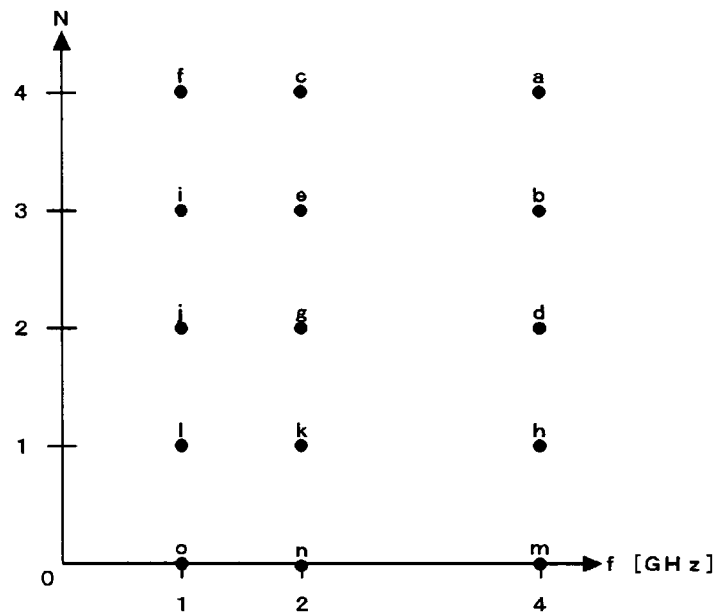
FIG. 3 is a diagram showing operation points which are combinations of the operating frequency and the number of sub processors in operation.
FIG. 4 is a chart showing a performance table.

FIG. 3 is a diagram showing operation points which are combinations of the operating frequency and the number of sub processors 200 in operation. In FIG. 3, the abscissa shows 4 GHz, 2 GHz, and 1 GHz, which are available settings of the operating frequency. The ordinate shows four to zero, which are available settings of the number of sub processors 200 in operation. The setting of zero represents the cases where the main processor 100 alone is in operation. In consequence, FIG. 3 has fifteen operation points a to o. The operation point a at the top right is the highest in performance, and the operation point o at the bottom left the lowest in performance. Typical full operation falls on the operation point a, where the number of sub processors 200 in operation is four and the operating frequency is 4 GHz.

A task management unit 121 grasps the state of execution of tasks after the foregoing period Δt, and identifies the number of sub processors 200 available in parallel at that time. Then, the number of sub processors available in parallel is passed to the temperature control unit 120. The states of execution of tasks include where a single task is in execution and where a plurality of tasks are in execution. Depending on the properties of the respective tasks, some of the tasks can only be executed by a single sub processor 200, and some by a plurality of sub processors 200.

FIG. 4 is a chart showing a performance table 122. The performance table 122 contains candidates for operation points in association with the number of sub processors 200 used in parallel. The operation points are registered in descending order of performance from the top. For example, in the case of using two sub processors 200, the operation points descend in performance in order of d→g→h→j→k→l→m→n→o. Incidentally, the amounts of heat to be generated in the foregoing period Δt at the respective operation points may be entered in the performance table 122 in advance.

When the estimated temperature $T_{t+\Delta t}$ reaches the predetermined threshold temperature, the temperature control unit 120 needs to decrease the amount of heat generation by reducing the number of sub processors 200 in parallel operation or lowering the operating frequency of the entire processor 1. In so doing, the temperature control unit 120 acquires the number of sub processor 200 available in parallel after the foregoing period Δt, input from the task management unit 120. The temperature control unit 120 then consults the performance table 122 based on that number, and identifies available candidates of operation points. The sub processor control unit 130 switches the number of sub processors 200 in operation under an instruction from the temperature control unit 120. The frequency control unit 140 switches the operating frequency under an instruction from the temperature control unit 120.

Figure 5:
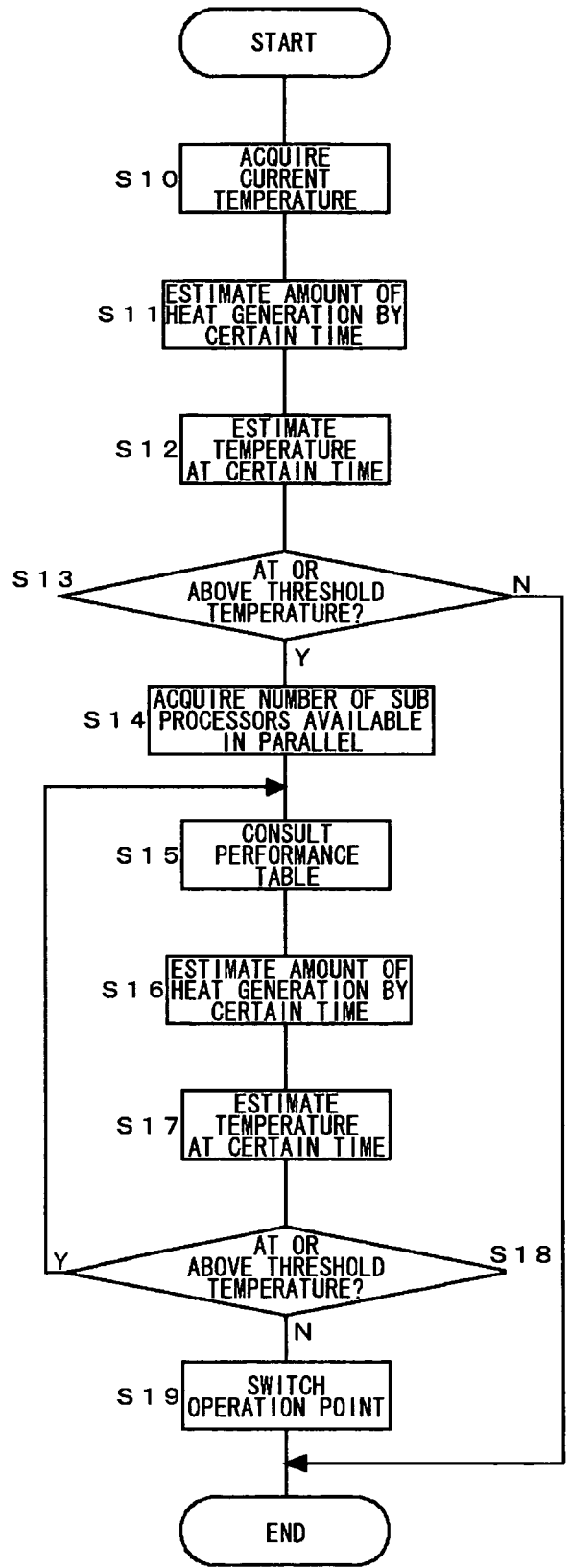
FIG. 5 is a flowchart for explaining the operation of the functional blocks of FIG. 2.

FIG. 5 is a flowchart for explaining the operation of the functional blocks shown in FIG. 2. Initially, the temperature control unit 120 acquires the current temperature inside the chip from the temperature sensor 400 (S10). Next, the heat generation amount estimation unit 110 acquires the number of sub processors 200 currently in operation from the sub processor control unit 130, and acquires the current operating frequency of the entire processor 1 from the frequency control unit 140. These values are then substituted into the foregoing equations (2) and (3) to estimate the amount of heat to be generated in the foregoing period Δt (S11). Then the heat generation amount estimation unit 110 passes it to the temperature control unit 120. The temperature control unit 120 estimates the temperature after the foregoing period Δt based on the current temperature acquired from the temperature sensor 400 and the amount of heat generation estimated by the heat generation amount estimation unit 110 (S12).

Next, the temperature control unit 120 compares this estimated temperature and a predetermined threshold temperature (S13). If the estimated temperature does not reach the predetermined threshold temperature (N at S13), the number of sub processors 200 currently in operation and the current operating frequency need not be switched since proper operation at the temperature after the foregoing period Δt is guaranteed.

If the estimated temperature is higher than or equal to the predetermined threshold temperature (Y at S13), the temperature control unit 120 acquires the number of sub processors 200 available in parallel after that period Δt from the task management unit 121 (S14). The temperature control unit 120 then consults the performance table 122 (S15). More specifically, it consults the performance table 122 to check the field corresponding to the number of sub processors available in parallel, and identifies candidates for the next operation point to which the current operation point is shifted. The performance table 122 lists available operation points with respect to each field of the number of sub processors available in parallel, in ascending order of loss in performance. Consequently, the candidate for the next operation point is one that causes a smallest drop in performance with respect to the performance of the current operation point. The temperature control unit 120 acquires the number of sub processors 200 to operate and the operating frequency of the entire processor 1 at that operation point, and passes them to the heat generation amount estimation unit 110.

The heat generation amount estimation unit 110 substitutes the number of sub processors 200 to operate and the operating frequency of the entire processor 1 passed from the temperature control unit 120 into the foregoing equations (2) and (3). The amount of heat to be generated in the foregoing period Δt is thus estimated again and returned to the temperature control unit 120 (S16). Incidentally, when the amounts of heat generation in the foregoing period Δt at the respective operation points are entered in the performance table 122 in advance, those values may be used. The temperature control unit 120 estimates the temperature after the foregoing period Δt again based on the current temperature acquired from the temperature sensor 400 and the amount of heat generation estimated by the heat generation amount estimation unit 110 (S17).

Next, the temperature control unit 120 compares this estimated temperature and the predetermined threshold temperature again (S18). If the estimated temperature does not reach the predetermined threshold temperature (N at S18), proper operation at the temperature after the foregoing period Δt is guaranteed when the operation point is shifted to the current candidate. In order to shift to the candidate of the operation point, the temperature control unit 120 thus gives an instruction to the sub processor control unit 130 to reduce the number of sub processor 200 in operation, or gives an instruction to the frequency control unit 140 to lower the operating frequency of the entire processor 1. Alternatively, both the adjustments are made (S19).

At S18, if the estimated temperature is higher than or equal to the predetermined threshold temperature (Y at S18), the temperature control unit 120 moves to S15 to consult the performance table 122 again (S15). Then, the current candidate of the operation point is changed to the next candidate of the operation point. Subsequently, the processing of S16 and S17 described above is repeated until the temperature estimated at S17 falls below the predetermined threshold temperature (N at S18).

As described above, according to the present embodiment, when the temperature of the processor 1 is estimated to reach or exceed the predetermined threshold temperature, the number of sub processors 200 in operation can be reduced and/or the operating frequency of the entire processor 1 can be lowered to avoid the situation in advance. In so doing, the performance table 122 can be consulted to shift to an operation point where the performance suffers the least loss.

Note that the operating frequencies of 1 GHz, 2 GHz, and 4 GHz mentioned above are ones to be supplied to the chip, whereas the main processor 100 and the sub processors 200 in the chip do not necessarily operate on these frequencies. A frequency effectively used for operation, i.e., an effective frequency is lower than the frequencies mentioned above. This effective frequency varies task by task. Then, in estimating the amount of heat generation by using the foregoing equation (2), the effective frequency may be substituted into f. The task management unit 121 identifies tasks to be executed during the foregoing period Δt from the present, and determines the effective frequencies corresponding to the tasks. The heat generation amount estimation unit 110 substitutes the effective frequencies into the foregoing equation (2) to calculate the estimated amount of heat generation E. As a result, it is possible to take account of tasks even in the phase of calculating the estimated amount of heat generation E, thereby allowing temperature estimation of higher accuracy.

Second Embodiment

A second embodiment will deal with the case where the estimated amount of heat generation E is not determined by calculation as in the first embodiment, but is registered in a table in advance. FIG. 6 is a diagram showing functional blocks according to the second embodiment, which are realized chiefly by the cooperation of the main processor 100, the memory unit 300, and software programs loaded into the memory unit 300. A task table 115 contains task by task the number of sub processors 200 available in parallel and the amount of heat generation. FIG. 7 is a chart showing the task table 115. Task types include, for example, key-entry wait, MPEG data decoding, and voice recognition. The number of sub processors 200 available in parallel varies from one task to another. With tasks that must be performed by the main processor 100 alone, the number is zero. With tasks capable of parallel processing, the number is one or above. The amounts of heat generation are task-specific amounts of heat occurring in the period Δt, determined by the foregoing equation (1). Values obtained through experiments in advance may be registered.

The task management unit 121 grasps the state of execution of tasks in the foregoing period Δt, identifies the one or more tasks to be executed in that period Δt, and passes the result to the heat generation amount estimation unit 110. Based on the type(s) of the task(s) identified by the task management unit 121, the heat generation amount estimation unit 110 consults the task table 115 to determine the estimated amount of heat generation E of the entire processor 1. If a plurality of tasks are executed, the amounts of heat generation of the tasks are summed up. The temperature sensor 400 outputs the current chip temperature to the temperature control unit 120.

As shown in the foregoing equation (1), the temperature control unit 120 estimates the temperature $T_{t+\Delta t}$ after the foregoing period Δt based on the current temperature $T_t$ acquired from the temperature sensor 400 and the estimated amount of heat generation E. Then, as shown in the foregoing formula (4), it is determined if this estimated temperature $T_{t+\Delta t}$ reaches or exceeds a predetermined threshold temperature $T_{th}$. If the predetermined threshold temperature $T_{th}$ is reached or exceeded, the temperature control unit 120 shifts the operation point. As described in the first embodiment, the operation point is shifted by consulting the performance table 122 shown in FIGS. 3 and 4.

The task management unit 121 grasps the state of execution of tasks after the foregoing period Δt, and identifies the number of sub processors 200 available in parallel at that time. Then, the number of sub processors available in parallel is output to the temperature control unit 120. When the temperature control unit 120 consults the performance table 122 and shifts the operation point, it also takes account of the number of sub processors 200 available in parallel acquired from the task management unit 121. In shifting the operation point, the sub processor control unit 130 switches the number of sub processors 200 in operation under an instruction from the temperature control unit 120. The frequency control unit 140 switches the operating frequency under an instruction from the temperature control unit 120.

Incidentally, the operation of the functional blocks shown in FIG. 6 is basically the same as that of the first embodiment where described in conjunction with the flowchart of FIG. 5. A difference lies in that the heat generation amount estimation unit 110, at S11, estimates the amount of heat to be generated in a period Δt based on the task table 115 and the state of execution of tasks acquired from the task management unit 121.

As above, according to the second embodiment, the amount of heat generation of the entire chip is estimated by consulting the task table in which the amounts of heat generation are registered task by task in advance. Highly accurate temperature estimation, taking account of tasks, can thus be performed by simple processing.

Third Embodiment

A third embodiment will deal with the case where a plurality of temperature sensors 400 are provided in the chip. FIG. 8 is a diagram showing the configuration of a processor according to the third embodiment. The processor 1 includes, in its chip, a main processor 100, four first to fourth sub processors 200a to 200d, a memory unit 300, and four first to fourth temperature sensors 400a to 400d. The first temperature sensor 400a measures the temperature of the block a, and the second temperature sensor 400b the temperature of the block b. The same holds for the third temperature sensor 400c and the fourth temperature sensor 400d. The temperature sensors 400 are not limited to four in number, but may be provided in any arbitrary number. For example, two temperature sensors may be provided. They are not limited to the layout pattern shown in FIG. 8, either, but may be arranged arbitrarily. The rest of the configuration is the same as described in FIG. 1.

The third embodiment can be achieved by the same configurations as in the functional block diagrams shown in FIGS. 2 and 6. A difference from the first and second embodiments consists in that there are a plurality of temperature sensors 400. That is, the current temperatures of the respective blocks are input to the temperature control unit 120.

Figure 9:
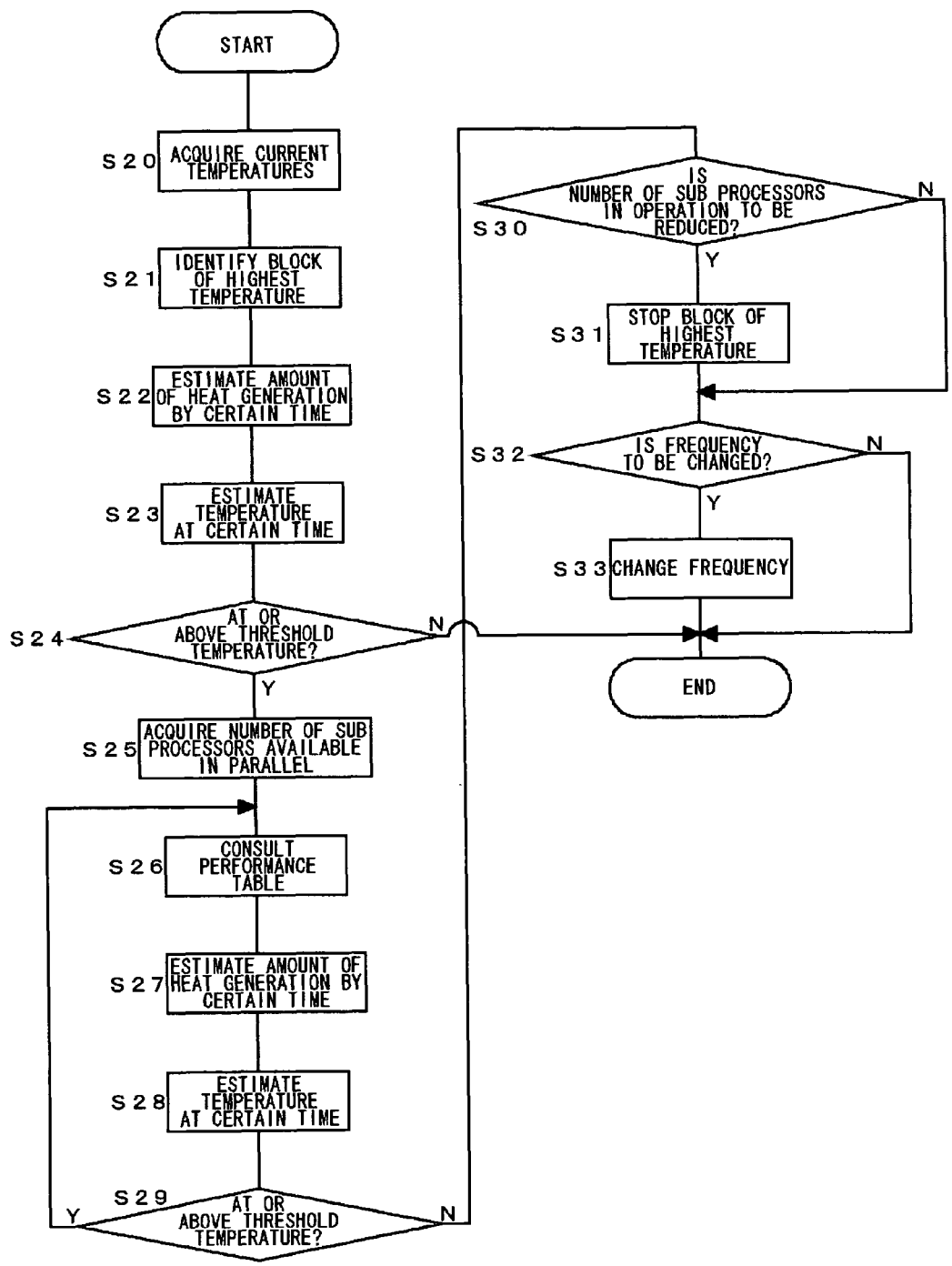
FIG. 9 is a flowchart for explaining the third embodiment.

FIG. 9 is a flowchart for explaining the third embodiment. Initially, the temperature control unit 120 acquires the current temperatures of the blocks from the plurality of temperature sensors 400, respectively (S20). Based on the temperatures, the temperature control unit 120 identifies a block that has the highest temperature (S21). Next, the heat generation amount estimation unit 110 acquires the number of sub processors 200 currently in operation from the sub processor control unit 130, and acquires the current operating frequency of the processor 1 from the frequency control unit 140. These values are then substituted into the foregoing equations (2) and (3) to estimate the amount of heat to be generated in the foregoing period Δt (S22). Incidentally, based on the types of tasks identified by the task management unit 121, the heat generation amount estimation unit 110 may consult the task table 115 to estimate the amount of heat generation of the entire processor 1. The temperature control unit 120 estimates the temperature after the foregoing period Δt based on the highest temperature identified and the amount of heat generation estimated by the heat generation amount estimation unit 110 (S23).

Next, the temperature control unit 120 compares this estimated temperature and a predetermined threshold temperature (S24). If the estimated temperature does not reach the predetermined threshold temperature (N at S24), the number of sub processors 200 currently in operation and the current operating frequency need not be switched since proper operation is guaranteed at the temperature after the foregoing period Δt.

If the estimated temperature is higher than or equal to the predetermined threshold temperature (Y at S24), the temperature control unit 120 acquires the number of sub processors 200 available in parallel after that period Δt from the task management unit 121 (S25). The temperature control unit 120 then consults the performance table 122 (S26). The temperature control unit 120 identifies the candidate of the operation point from the performance table 122, acquires the number of sub processors 200 to operate and the operating frequency of the processor 1 at that operation point, and passes the same to the heat generation amount estimation unit 110.

The heat generation amount estimation unit 110 substitutes the number of sub processors 200 to operate and the operating frequency of the processor 1 passed from the temperature control unit 120 into the foregoing equations (2) and (3). The amount of heat to be generated in the foregoing period Δt is thus estimated again and returned to the temperature control unit 120 (S27). The temperature control unit 120 estimates the temperature after the foregoing period Δt again based on the highest temperature and the amount of heat generation estimated by the heat generation amount estimation unit 110 (S28).

Next, the temperature control unit 120 compares this estimated temperature and the predetermined threshold temperature again (S29). If the estimated temperature is higher than or equal to the predetermined threshold temperature (Y at S29), the temperature control unit 120 moves to S26 to consult the performance table 122 again (S26). Then, the current candidate of the operation point is changed to the next candidate of the operation point. Subsequently, the processing of S27 and S28 described above is repeated until the temperature estimated at S28 falls below the predetermined threshold temperature (N at S29).

At S29, if the estimated temperature does not reach the predetermined threshold temperature (N at S29), proper operation at the temperature after the foregoing period Δt is guaranteed when the operation point is shifted to the current candidate. The temperature control unit 120 thus gives instructions to either one or both of the sub processor control unit 130 and the frequency control unit 140 so as to shift to the candidate of the operation point. Initially, if the number of sub processors 200 in operation needs to be reduced in order to shift to the candidate of the operation point (Y at S30), the sub processor control unit 130 stops the sub processor(s) 200 designated by the temperature control unit 120 (S31).

Here, the temperature control unit 120 gives an instruction to stop the sub processor 200 pertaining to the block of the highest temperature. If the sub processor 200 of that block is at rest, the temperature control unit 120 gives an instruction to stop a sub processor 200 that lies in a position closest to that block. For example, in FIG. 8, if the block a has the highest temperature and the number of sub processors 200 in operation is shifted from four to two, the first sub processor 200a and the second sub processor 200b are stopped. As above, the sub processors 200 are stopped in such order that the one pertaining to a block of the highest temperature is followed by ones lying near the block. The order in which the sub processors 200 are stopped when the respective blocks have the highest temperature may be registered in a table in advance. In that case, the temperature control unit 120 gives instructions to the sub processor control unit 130 by consulting this table.

Next, if the operating frequency of the entire processor 1 needs to be changed in order to shift to the foregoing operation point (Y at S32), the frequency control unit 140 makes a change to the operating frequency designated by the temperature control unit 120 (S33).

As described above, according to the third embodiment, the sub processor(s) pertaining to or close to a block of the highest temperature is/are stopped first when shifting the operation point. This makes it possible to control the temperature inside the chip so as to equalize the temperature distribution within the chip.

Fourth Embodiment

A fourth embodiment will deal with the case where tasks are allocated in accordance with the temperatures of the respective blocks. The processor according to the fourth embodiment has the same configuration as described in FIG. 8. FIG. 10 is a diagram showing functional blocks according to the fourth embodiment, which are realized chiefly by the cooperation of the main processor 100, the memory unit 300, and software programs loaded into the memory unit 300. The plurality of temperature sensors 400 output the current temperatures of the respective sub processors 200a to 200d, or the current temperatures of the respective blocks a to d into which the chip area is divided, to the temperature control unit 120. The plurality of temperature sensors 400 may be placed in positions where to measure the temperatures of the respective sub processors 200a to 200d directly, or in positions where to measure the temperatures of the respective blocks a to d.

The task management unit 121 grasps the state of execution of tasks and the state of queues at present, and passes the number of next tasks available to be executed in parallel to the temperature control unit 120. The number of tasks available in parallel varies with the properties of the respective tasks.

The temperature control unit 120 creates a table for listing the sub processors 200a to 200d in ascending order of temperature based on the temperatures input from the plurality of temperature sensors 400. FIG. 11 is a chart showing the table sorted in ascending order of temperature according to the fourth embodiment. FIG. 11 shows the fourth sub processor d→the second sub processor b→the third sub processor c→the first sub processor a, which are sorted in ascending order of temperature. The order is changed adaptively in accordance with the temperatures input from the plurality of temperature sensors 400. Incidentally, this table may manage not only the order of temperature of the individual sub processors 200a to 200d but also the actual or estimated temperatures of the respective sub processors 200a to 200d.

When the temperatures of the blocks a to d are input from the plurality of temperature sensors 400, the temperatures of the sub processors 200a to 200d may be estimated by calculation based on the distances between the plurality of temperature sensors 400 and the sub processors 200a to 200d, respectively.

The temperature control unit 120 consults the foregoing table and allocates next tasks to be executed among sub processors of low temperatures. Here, which sub processors to allocate tasks to is determined in consideration of the number of next tasks to be executed in parallel. Specifically, when the number to be executed in parallel is two, the tasks are allocated to the top two sub processors in ascending order of temperature with reference to the foregoing table. This makes it possible to achieve temperature uniformization while suppressing a drop in performance. It is understood that the tasks may be allocated to a single sub processor alone. Incidentally, when the foregoing table also manages the temperatures of the respective sub processors 200a to 200d, sub processors exceeding a predetermined threshold temperature may be excluded from the allocation candidates even when they are supposed to be allocation candidates in terms of the number of sub processors available in parallel. It follows that the tasks are executed by sub processors fewer than the number of sub processors available in parallel. For the threshold temperature, an optimum setting may be determined by actual measurement or simulation. The setting may be made slightly lower in consideration of a temperature increase after the execution of allocated tasks. This can suppress spot-like heat generation.

The temperature control unit 120 instructs the sub processor control unit 130 which of the sub processors to allocate the tasks to. The sub processor control unit 130 controls the individual sub processors 200a to 200d for operation/nonoperation under instructions from the temperature control unit 120.

FIG. 12 is a flowchart for explaining the fourth embodiment. Initially, the temperature control unit 120 acquires the temperatures of the sub processors 200a to 200d or the current temperatures of the blocks a to d from the plurality of temperature sensors 400, respectively (S40). Next, all the sub processor 200a to 200d are sorted in ascending order of temperature (S41). Then, next tasks to be executed are allocated to one or more sub processors (S42). Here, such factors as the number of sub processors available for those tasks in parallel and whether or not the temperatures of the respective sub processors 200a to 200d exceed the predetermined threshold temperature may be taken into account.

As above, according to the fourth embodiment, tasks are allocated to sub processors of lower temperatures by priority so as to control the plurality of sub processors toward uniform temperatures. It is therefore possible to make the temperature distribution within the chip uniform. This also makes it possible to avoid the possibility of spot-like heat generation. Note that the present embodiment has dealt with the case where which of the sub processors to allocate tasks to is determined based on the temperatures of the respective sub processors. Instead, the "sub processors" may be replaced with the "blocks" into which the chip area is divided. It follows that the temperatures of the blocks are sorted in ascending order, and tasks are allocated to sub processors adjacent to blocks of lower temperatures.

Up to this point, the present invention has been described in conjunction with the embodiment thereof. These embodiments are given solely by way of illustration. It will be understood by those skilled in the art that various modifications may be made to combinations of the foregoing components and processes, and all such modifications are also intended to fall within the scope of the present invention.

The embodiments have dealt with the cases where the estimated temperature after the foregoing period Δt is compared with the predetermined threshold temperature. Instead, the current temperature(s) acquired from the temperature sensor(s) 400 may be compared with a predetermined threshold temperature. In this case, the predetermined threshold temperature is preferably set to be somewhat lower than in the embodiments.

In the foregoing equation (1), the temperature $T_{t+\Delta t}$ after the period Δt has been described as being a function of the current temperature $T_t$ and the estimated amount of heat generation E. In this respect, combination of the sub processors 200 may be added to the factors. The temperature $T_{t+\Delta t}$ after the period Δt depends chiefly on the state of execution of tasks. Besides, physical properties also have effects such that tasks simultaneously allocated to adjoining sub processors 200 tend to generate heat more than when the tasks are distributed to discrete sub processors 200. The temperature control unit 120 may thus estimate the temperature $T_{t+\Delta t}$ after the period Δt even in consideration of the combination of the sub processors 200 for executing tasks.

The blocks described in the third embodiment are ideally sectioned to the sizes of spot-like areas where heat generation peaks. Nevertheless, the sizes of the blocks may be determined freely in accordance with the desired precision of the heat generation control and the required specifications of the processor 1. Moreover, the blocks may be sectioned in identical sizes systematically or sectioned unevenly along the boundaries of various processors.

The number, layout, and positions of sub processors 200, and the number, layout, and positions of temperature sensors 400 may be set arbitrarily. The possible operating frequencies to be listed in the performance table 122 and the possible numbers of sub processors 200 may also be set arbitrarily. The order in which the sub processors 200 are stopped, to be listed in a predetermined table, may also be set arbitrarily. The stopping order is determined chiefly in accordance with the positions from a block of the highest temperature, whereas the order may be set in consideration of physical relationship from essential circuit elements.

It is understood that the processor of the present invention may be applied to a control unit of an information processing apparatus such as a PC, a workstation, a game machine, a PDA, and a cellular phone. The processor of the present invention may also be applied to such an information processing system as is constructed by sharing resources distributed over a network.

The present invention is applicable to the field of performance control on a processor that comprises a plurality of processing blocks.

What is claimed is:

1. A method of controlling a processor comprising:
consulting a table that lists a plurality of operation points defined by combinations, wherein each comprises:
a) the number of a plurality of subprocessors formed inside a processor that are in operation; and
b) one of a plurality of operating frequencies available for use by switching, so as to switch between the operation points in accordance with a temperature.

2. The method of controlling a processor according to claim 1, comprising allocating tasks to at least a subprocessor having a lowest temperature among the subprocessors.

3. The method of controlling a processor according to claim 1, comprising allocating tasks in consideration of the number of the subprocessors available in parallel, the number being determined task by task.

4. The method of controlling a processor according to claim 3, comprising allocating tasks to at least a subprocessor having a lowest temperature among the plurality of subprocessors.

5. The method of controlling a processor comprising: consulting a table that lists a plurality of operation points defined by combinations, wherein each comprises:
a) the number of subprocessors formed inside a processor that are in operation; and
b) one of a plurality of operating frequencies available for use by switching, so as to switch between the operation points.

6. A method of controlling a processor according to claim 5, wherein the table lists the plurality of operation points in order of processing performance.

7. The method of controlling a processor according to claim 6, wherein when the processor is predicted to exceed or exceeds a predetermined threshold in temperature, an operation point yielding a smaller amount of heat generation than that of an operation point selected currently is detected out of the operation points, so that the operation point selected currently is switched to the operation point detected.

8. The method of controlling a processor according to claim 7, wherein when a plurality of operation points are detected, the operation point selected currently is switched to a operation point yielding maximum performance.

9. A processor comprising:
a plurality of subprocessors;
a sensor, which measures a temperature;
a table that lists a plurality of operation points defined by combinations, wherein each comprises: a) the number of subprocessors in operation; and b) one of a plurality of operating frequencies available for use by switching; and
a control unit, which consults the table and switches between the operation points in accordance with the measured temperature.

10. The processor according to claim 9, wherein the control unit allocates tasks to at least a subprocessor having a lowest temperature among the plurality of subprocessors.

11. The processor according to claim 9, wherein the control unit allocates tasks in consideration of the number of the plurality of subprocessors available in parallel, the number being determined task by task.

12. The processor according to claim 11, wherein the control unit allocates tasks to at least a subprocessor having a lowest temperature among the plurality of subprocessors.

13. A processor comprising:
a plurality of subprocessors;
a table, which lists a plurality of operation points defined by combinations, wherein each comprises: a) the number of subprocessors in operation; and b) one of a plurality of operating frequencies available for use by switching; and
a control unit, which consults the table and switches between the operation points as appropriate.

14. The processor according to claim 13, wherein the table lists processing performance for each of the combinations.

15. The processor according to claim 14, wherein when the processor is predicted to exceed or exceeds a predetermined threshold in temperature, the control unit selects an operation point yielding a smaller amount of heat generation than at present out of the operation points, and switches to the operation point selected.

16. An information processing apparatus comprising a processor, which executes various tasks,
the processor including:
a plurality of subprocessors;
a sensor, which measures a temperature;
a table that lists a plurality of operation points defined by combinations, where each comprises: a) the number of subprocessors in operation; and b) one of a plurality of operating frequencies available for use by switching; and
a control unit, which consults the table and switches between the operation points in accordance with the measured temperature.

17. The information processing apparatus according to claim 16, wherein the control unit allocates tasks to at least a subprocessor having a lowest temperature among the plurality of subprocessors.

18. The information processing apparatus according to claim 16, wherein the control unit allocates tasks in consideration of the number of the plurality of subprocessors available in parallel, the number being determined task by task.

19. The information processing apparatus according to claim 18, wherein the control unit allocates tasks to at least a subprocessor having a lowest temperature among the plurality of subprocessors.

20. An information processing apparatus comprising a processor, which executes various tasks,
the processor including:
a plurality of subprocessors processing blocks;
a table, which lists a plurality of operation points defined by combinations, where each comprises: a) the number of subprocessors in operation; and b) one of a plurality of operating frequencies available for use by switching; and
a control unit, which consults the table and switches between the operation points as appropriate.

21. An information processing system comprising a processor, which executes various tasks,
the processor including:
a plurality of subprocessors;
a sensor, which measures a temperature;
a table, which lists a plurality of operation points defined by combinations, wherein each comprises: a) the number of subprocessors in operation; and b) one of a plurality of operating frequencies available for use by switching; and
a control unit, which consults the table and switches between the operation points in accordance with the measured temperature.

22. The information processing system according to claim 21, wherein the control unit allocates tasks to at least a subprocessor having a lowest temperature among the plurality of subprocessors.

23. The information processing system according to claim 21, wherein the control unit allocates tasks in consideration of the number of the plurality of subprocessors available in parallel, the number being determined task by task.

24. The information processing system according to claim 23, wherein the control unit allocates tasks to at least a subprocessor having a lowest temperature among the plurality of processing tasks.

25. An information processing system comprising a processor, which executes various tasks,
the processor including:
a plurality of subprocessors;
a table, which lists a plurality of operation points defined by combinations, wherein each comprises: a) the number of subprocessors in operation; and b) one of a plurality of operating frequencies available for use by switching; and
a control unit, which consults the table and switches between the operation points as appropriate.

26. A processor readable storage medium having stored thereon a processor control program comprising instructions for:
consulting a table that lists a plurality of operation points defined by combinations, wherein each comprises: a) the number of subprocessors formed inside a processor in operation; and b) one of a plurality of operating frequencies available for use by switching, and
switching between the operation points in accordance with a temperature.

27. The processor readable storage medium according to claim 26, further comprising instructions for allocating tasks to at least a subprocessor having a lowest temperature among the plurality of subprocessors.

28. The processor readable storage medium according to claim 26, further comprising instructions for allocating tasks in consideration of the number of the plurality of subprocessors available in parallel, the number being determined task by task.

29. The processor readable storage medium according to claim 28, further comprising instructions for allocating tasks to at least a subprocessor having a lowest temperature among the plurality of processing tasks.

30. A processor readable storage medium comprising a processor control program comprising instructions for:

consulting a table that lists a plurality of operation points defined by combinations, wherein each comprises each comprising: a) the number of subprocessors formed inside a processor in operation; and b) one of a plurality of operating frequencies available for use by switching, and switching between the operation points.

* * * * *